No. 780,130. PATENTED JAN. 17, 1905.
B. SALZER & G. WALTHER.
VARIABLE CAM.
APPLICATION FILED DEC. 1, 1902.

2 SHEETS—SHEET 1.

No. 780,130. PATENTED JAN. 17, 1905.
B. SALZER & G. WALTHER.
VARIABLE CAM.
APPLICATION FILED DEC. 1, 1902.

2 SHEETS—SHEET 2.

No. 780,130. Patented January 17, 1905.

UNITED STATES PATENT OFFICE.

BRUNO SALZER AND GUSTAV WALTHER, OF CHEMNITZ, GERMANY.

VARIABLE CAM.

SPECIFICATION forming part of Letters Patent No. 780,130, dated January 17, 1905.

Application filed December 1, 1902. Serial No. 133,494.

*To all whom it may concern:*

Be it known that we, BRUNO SALZER and GUSTAV WALTHER, subjects of the German Emperor, and residents of Chemnitz, in the Kingdom of Saxony and Empire of Germany, have invented certain new and useful Improvements in Variable Cams, of which the following is a specification.

This invention relates to an element of machine of that well-known kind which renders it possible to transmit the continuous rotary motion of a driving part—for instance, of a shaft journaled in fixed bearings—to another machine part the bearing of which does not allow the latter to complete a rotary motion, but only to move it to and fro.

Figure 1:
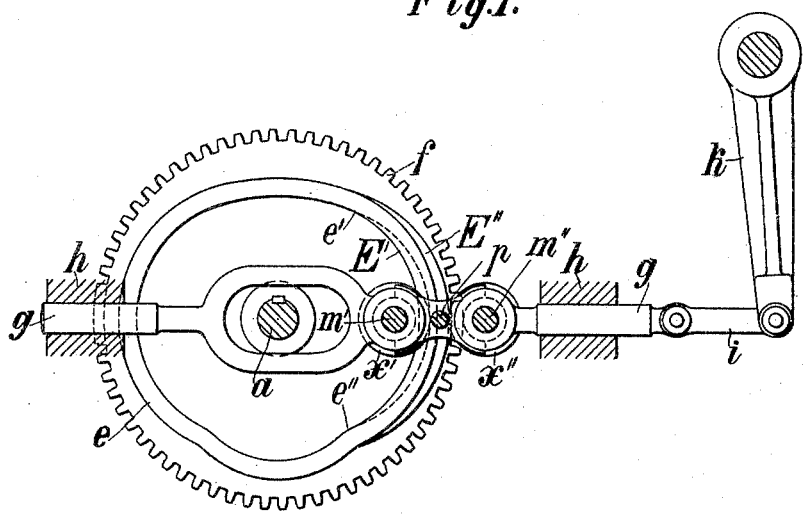
Figure 2:
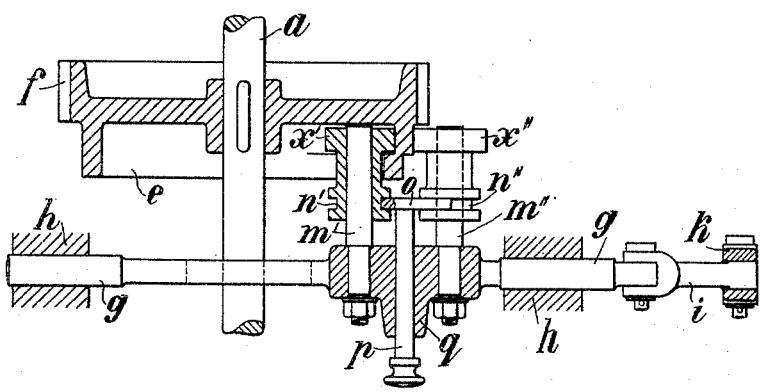

In the annexed drawings, Figure 1 represents the device in front view, and Fig. 2 shows a plan view, Figs. 3 to 8 representing another modified form of construction.

$f$ is the driving part; $k$, the driven part. The parts $m'\,m''\,x'\,x''\,o\,g$, arranged between $f$ and $k$, serve for the purpose of transmitting motion and are partly well known. The new feature in this arrangement, however, is the combination of the guide-ring $e$ and the two rollers $x'\,x''$.

The shaft $a$ may be rotated in any optional manner—for instance, by a means of a gearing (not shown in the drawings) meshing with the cog-wheel $f$, keyed upon the shaft $a$. On the flat front side of the driving part $f$ a guide-ring $e$ is arranged, being both at its interior and exterior side of a cylindrical form composed of several cylinders of different curvature. These cylindrical curvatures are uniform along the part $e'\,e\,e''$ on the whole height of the ring, the ring shape upon the other part being composed of two cylinder parts $E'$ $E''$, differing from and displaced step-like in respect to each other. These two differently curved ring-steps $E'\,E''$ join at $e'\,e''$ and close upon the cylinder part at $e'\,e''$ in a gentle curve. Two rollers $x'\,x''$ are so arranged upon the connecting-rod $g$ that the one, $x'$, is always adjacent to the interior rim and the other adjacent to the exterior rim of the ring $e$. When, therefore, the wheel $f$ rotates with the ring $e$ the two rollers $x'\,x''$ and the connecting-rod $g$ receive a rectilinear movement to and fro, the direction of which is guaranteed by the connecting-rod $g$ being guided in the two bearings $h$. The one end of the rod $g$ is connected to the lever $k$ by means of the guide-bar $i$, which may transmit the motion it receives in any optional manner. The two rollers $x'\,x''$ are slidable upon the pivots $m$ in the direction of the axis of the latter and, for instance, can be displaced by the double fork $o$, attached to one end of connecting-rod $p$, engaging the ring-grooves $n$. As the connecting-rod $p$ is journaled in the sliding head $q$ rectilinearly slidable, it is possible to move the two rollers $x'\,x''$ to and fro during the action of the machine by catching hold at $p$. Of course this can be only accomplished when the roller $x'\,x''$ is in contact with the cylindrical part $e'\,e\,e''$ of the guide-ring.

In the position shown in the drawings, Figs. 1 and 2, a displacement is impossible.

Figure 3:
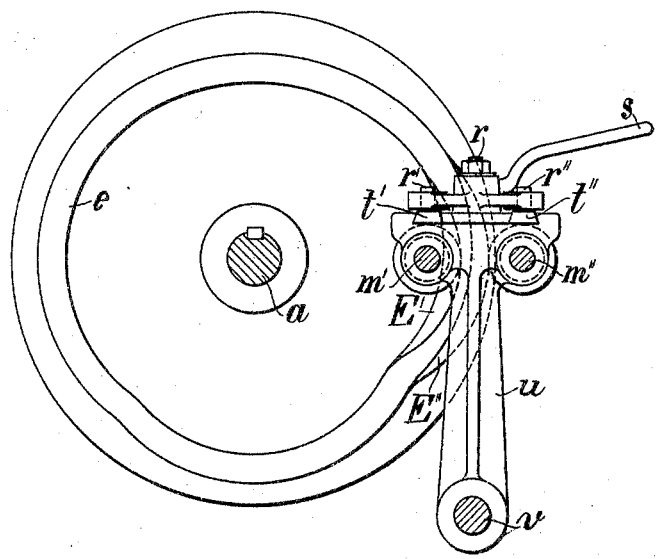
Figure 4:
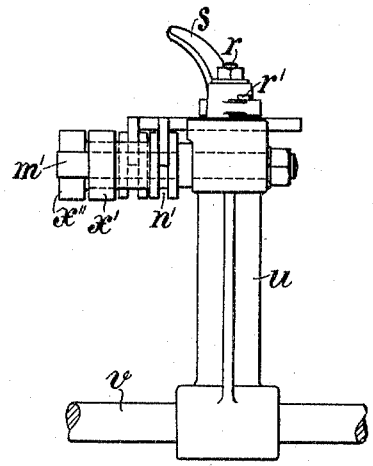
Figure 5:
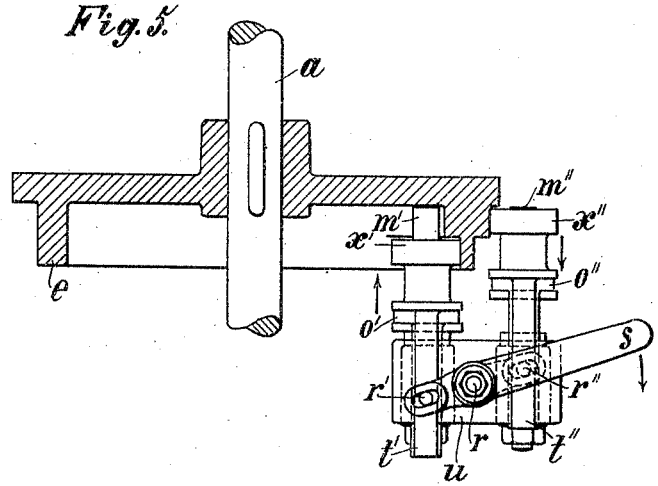
Figure 6:
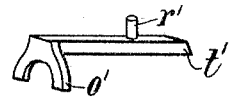
Figure 7:
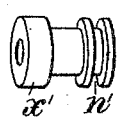
Figure 8:
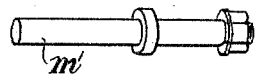

In Figs. 3 to 8 another form of construction of our invention is shown. Fig. 3 is a front view, Fig. 4 a side view, and Fig. 5 a section. In Figs. 6, 7, and 8 the slide $t'$, roller $x'$, and pivot $m'$, on which the roller $x'$ is arranged, are shown in perspective.

Figs. 3, 4, and 5 differ from the construction disclosed in Figs. 1 and 2 in that both rollers $x'\,x''$ are moved equally backward or equally forward on moving the connecting-rod or hand-lever $p$ forward or backward. In Fig. 5, however, the roller $x'$ is shoved back and the roller $x''$ pushed forward. Around the pivot $r$ oscillates a double-armed lever $s$, engaging the pins $r'\,r''$ of the two slides $t'\,t''$. These slides are provided with a fork $o'\,o''$ at their back, engaging the annular groove $n'\,n''$ of the rollers. When, therefore, the hand-lever $s$ is turned in the direction of the arrow in Fig. 5, the roller $x''$ advances in the direction of the arrow, the roller $x'$ returns, and vice versa. For this reason the back ring part $E''$ is broader than the front ring part $E'$. In Figs. 1, 2, $E'$ is just as broad as $E''$ and also equally broad to $e$. In Figs. 3, 5, $e$ is narrower than $E''$ and broader than $E'$.

The pivots $m'\,m''$ of the rollers are fixed to the lever $u$, mounted upon the shaft $v$. When the shaft $a$ is continually turned, the lever $u$ and the shaft $a$ consequently must swing alternately.

Having now described our invention, we declare that what we claim is—

1. The combination of a rotary member carrying a ring formed with two guides, a member moved thereby, and two rollers carried by the other member, one on each side of the ring, and means for throwing both rollers simultaneously from one guide to the other.

2. The combination of a rotary member carrying a ring formed with two guides, a member moved thereby and provided with two studs, a roller slidable on each of the studs on each side of the ring, and means for simultaneously moving both rollers from one guide to the other.

3. The combination with a rotating member having a plurality of guides upon its circumference and inner face, of a member to be moved thereby and two rollers carried by said latter member to be simultaneously moved into engagement with said guides.

4. The combination with a rotating member having a plurality of guides upon its circumference and inner face, of a member to be moved thereby, two rollers carried by said latter member and means for simultaneously moving said rollers to and fro in their direction of axis.

5. The combination with a rotating member having a plurality of guides upon its circumference and inner face, of a member to be moved thereby, two rollers carried by said latter member adapted to continuously abut against the interior and exterior circumferences of said guides respectively.

6. The combination with a rotating member having a plurality of guides upon its circumference and inner face, of a member to be moved thereby, two rollers carried by said latter member and means for moving the one roller backward on the other being moved forward in their direction of axis.

The foregoing specification signed at Chemnitz, Saxony, this 13th day of October, 1902.

BRUNO SALZER.
    GUSTAV WALTHER.

In presence of—
 FREDERICK J. DIETZMAN,
 E. C. MEYER.